United States Patent [19]

Geffner

[11] 3,751,121
[45] Aug. 7, 1973

[54] SEGMENTAL CAGE FOR LINEAR AND LINEAR/ROTARY BEARINGS
[75] Inventor: Ted Geffner, Merrick, N.Y.
[73] Assignee: The Barden Corporation, Danbury, Conn.
[22] Filed: Sept. 17, 1971
[21] Appl. No.: 181,367

[52] U.S. Cl. .................................. 308/6 C, 308/201
[51] Int. Cl. ........................ F16c 29/06, F16c 33/38
[58] Field of Search .................... 308/6 C, 201, 176

[56] References Cited
UNITED STATES PATENTS
3,476,445  11/1969  Carlson et al. ...................... 308/6 C
3,512,849  5/1970  Weisel ................................. 308/6 C
3,545,826  12/1970  Magee et al. ....................... 308/6 C Primary Examiner—Charles J. Myhre
Assistant Examiner—Barry Grossman
Attorney—Shenier & O'Connor

[57] ABSTRACT

A segmental cage for linear and linear-rotary bearings in which each of a plurality of identical cast cage segments comprises a body having cylindrical inner and outer surfaces and side edges lying in radial planes with an axially extending unloaded ball path-forming recess adjacent to one edge and with curved recesses adjacent its ends leading from the axial recess into an axially extending slot formed intermediate the segment edges with the slot adapted to receive a loading roller and so formed as to provide the loaded ball path and having a pair of axially spaced circumferentially extending lugs at the other edge adapted to extend into the curved recesses of an adjacent segment to define ball transfer paths for directing balls from the unloaded path to the loaded path.

11 Claims, 10 Drawing Figures

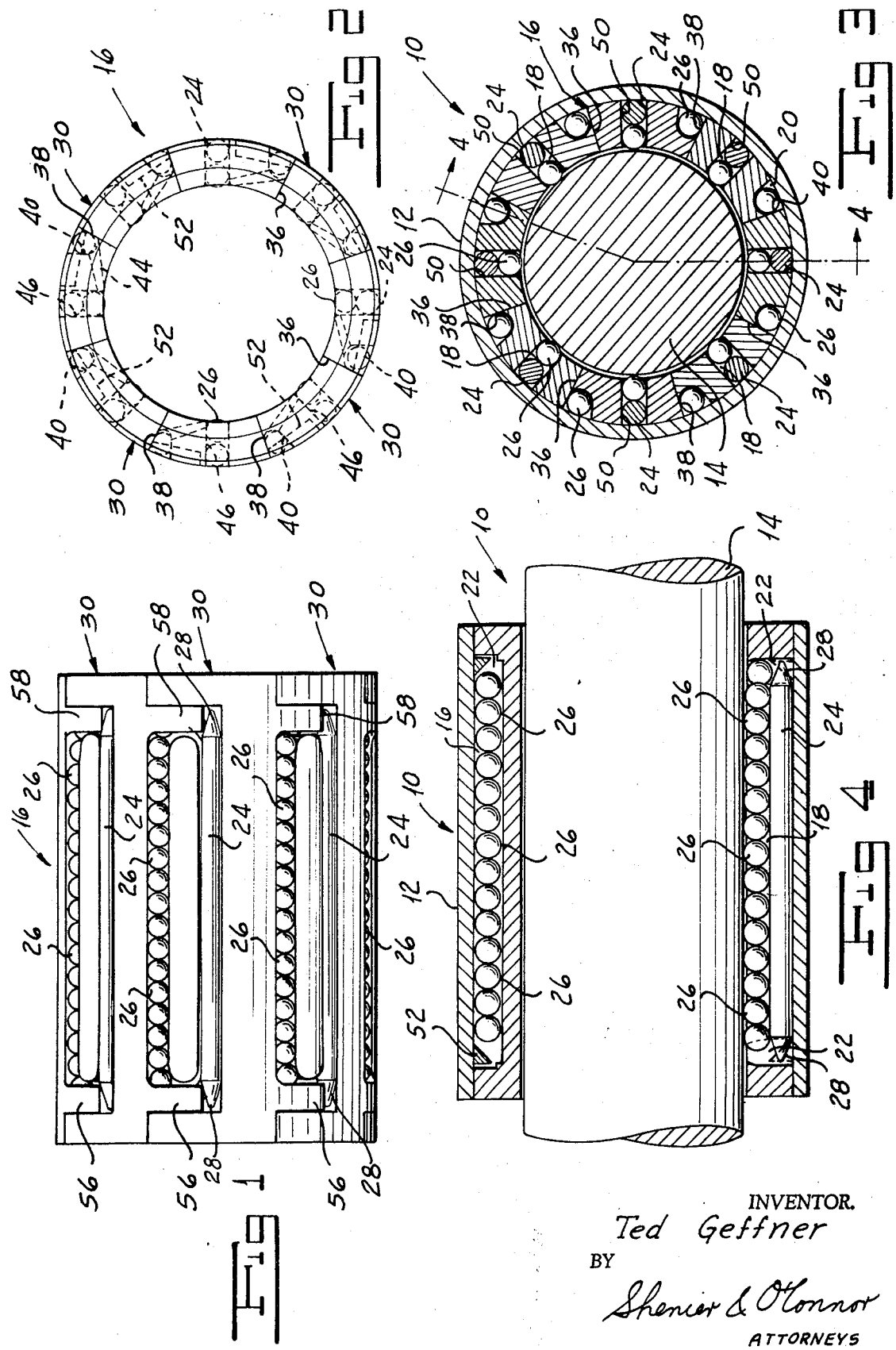

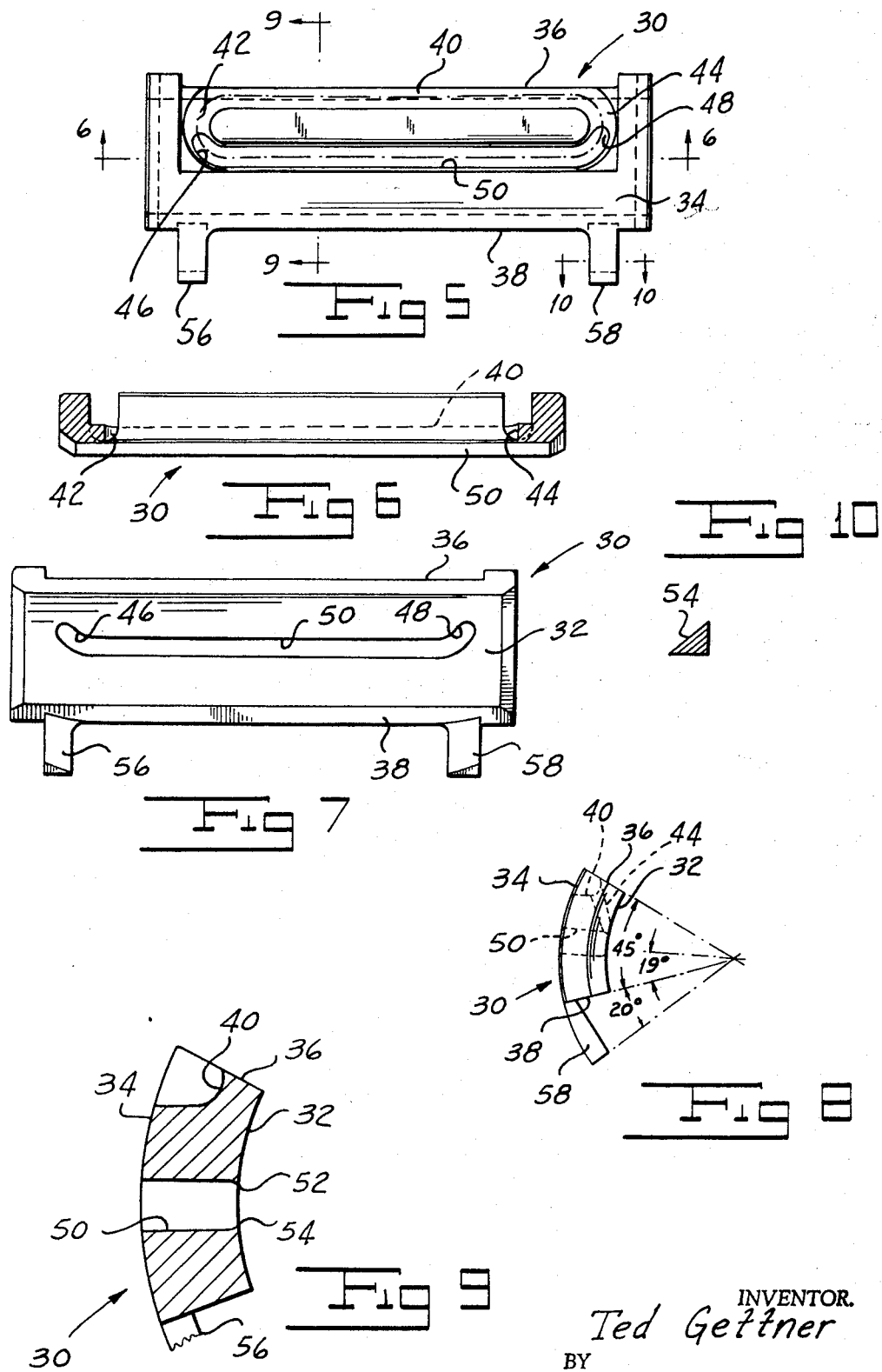

SEGMENTAL CAGE FOR LINEAR AND LINEAR/ROTARY BEARINGS

BACKGROUND OF THE INVENTION

My copending application Ser. No. 28,719, now Pat. No. 3,692,371, discloses an improved anti-friction bearing, one form of which is adapted to permit both rotary and axial relative movement between a shaft and a housing or the like. The bearing shown in my copending application includes a cage structure which is adapted to receive rollers and balls so as to form ball paths comprising loaded ball path portions extending axially and located between the shaft and the rollers and unloaded ball path portions extending axially and located between the outer housing or sleeve and the cage structure. The unloaded ball path portions are circumferentially spaced with respect to the loaded ball path portions and are connected thereto by ball transfer path portions. Attempts were made to cast the retainer structure from various synthetic resins. Such attempts, however, were not successful. The resultant retainer lacked dimensional stability. It was not as strong as desirable. The frictional resistance to movement of the balls along the paths was excessive. The cost of producing the parts was excessive.

Other attempts were made to cast the retainer as a single piece from a suitable metal such as zinc. The cost of making the complicated die required to form the retainer was found to be prohibitive. Even if the major portion of the retainer were die cast from metal, a separate cam element had to be provided in order to form the transfer path portions for directing the balls between the loaded and unloaded ball path portions.

I have invented a segmental cage for a combined linear and rotary bearing. My segmental cage may be cast at an overall cost which is appreciably less than the cost of casting a one piece retainer. My segmental cage does not require any separate cam element for forming the transfer portions of the ball paths.

SUMMARY OF THE INVENTION

One object of my invention is to provide a segmental ball cage for a combined linear and rotary bearing.

Another object of my invention is to provide a segmental cage for a combined linear and rotary bearing which can be cast from a relatively simple die.

Yet another object of my invention is to provide a segmental cage for a combined linear and rotary bearing which can be cast at a lower cost than can a unitary cage of similar configuration.

Other and further objects of my invention will appear from the following description.

In general, my invention contemplates the provision of a segmental cage for a combined linear and rotary bearing in which each one of a plurality of cage segments is an axially elongated arcuate body having an axially extending unloaded ball path-forming recess adjacent one of its edges and curved recesses adjacent its ends leading from the axial recess into an axially extending slot intermediate the body edges and adapted to receive a loading roller or rollers and to form a loaded ball path portion and having axially spaced circumferentially extending lugs or cam elements at its other edge for fitting into the curved recesses of an adjacent segment to complete the unloaded ball portion and the ball transfer path portions extending between the loaded and the unloaded ball path portions.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a side elevation of my segmental cage for combined linear and rotary bearing showing the loading rollers and balls.

FIG. 2 is an end elevation of my segmental cage for a combined linear and rotary bearing.

FIG. 3 is a sectional view of my segmental cage for combined linear and rotary bearing illustrating its relationship with the other parts of an installation with some parts removed.

FIG. 4 is a sectional view of the assembly shown in FIG. 3 taken along the line 4—4 of FIG. 3.

FIG. 5 is a top plan view of one segment of my segmental cage.

FIG. 6 is a sectional view of the segment shown in FIG. 5 taken along the line 6—6 of FIG. 5.

FIG. 7 is a bottom plan view of a segment of my segmental cage.

FIG. 8 is an end elevation of a segment of my segmental cage.

FIG. 9 is a sectional view of my segmental cage taken along the line 9—9 of FIG. 5 and drawn on an enlarged scale.

FIG. 10 is a sectional view of a portion of a segment of my segmental cage taken along the line 10—10 of FIG. 5.

DESCRIPTION OF THE PREFERRED EMBODIMENT

Referring now to FIGS. 1 to 4 of the drawings, a combined linear and rotary bearing indicated generally by the reference character 10 may include an outer sleeve or housing 12, a shaft 14, and my segmental cage indicated generally by the reference character 16. As will more fully be pointed out hereinbelow, the cage 16 provides a plurality of loaded ball path portions 18 and a plurality of unloaded ball path portions 20. Connecting path portions 22 adjacent the ends of the cage 16 connect the ends of the loaded path portions to the ends of the unloaded path portions 20. Loading rollers 24 located between the loaded path portions and the outer housing 12 so position the balls 26 as to be in load bearing relationship with the rollers 24 and the shaft 14. I provide the rollers 24 with tapered ends 28 which are engaged by the balls 26 as they move through the curved end portions to rotate rollers 24.

The structure thus far described with the exception of the segmental nature of the cage 16, is the same as that described in my copending application referred to hereinabove. The operation of the structure is set forth in detail in the copending application.

Referring now to FIGS. 5 to 10, the segmental cage 16 is made up of a plurality of identical segments, each of which is indicated generally by the reference character 30. As will further be pointed out hereinbelow in the particular embodiment of my cage shown in the drawings, eight segments 30 are required to make up a complete cage. I die cast each of the segments 30 from a suitable material such, for example, as zinc or aluminum or the like. Each segment 30 has an inner cylindrical surface 32 and an outer cylindrical surface 34, as well as respective circumferentially spaced sides 36 and 38 lying in radial planes.

I form each of the segments 30 with an axially extending recess 40 adjacent to and leading into the edge 36. The depth of the recess 40 in the radial direction is somewhat greater than half the thickness of the segment 30 so that the recess or groove 40 is adapted to form unloaded path portions 20 in a manner to be described.

I provide each of the segments 30 with respective curved recess portions 42 and 44 adjacent the ends thereof, which portions lead from the ends of the groove 40 into respective curved end portions 46 and 48 of an axial slot 50 located in the segment 30 intermediate the edges 36 and 38. It will be appreciated that the curved recess portions gradually deepen as they progress from the axially extending recess or groove 40 into curved end portions 46 and 48 of an axially extending slot 50 formed in the segment intermediate the sides 36 and 38. The cross sectional shape of the slot 46 is such as to form retaining lips 52 and 54 adjacent to the inner surface 32 of the segment 30.

I provide each of the segments 30 with a pair of axially spaced circumferentially extending cams or lugs 56 and 58 along the edge 38. The dimensions of lugs 56 and 58 are such that the lugs of one segment fit into the curved path portion of an adjacent segment and the edge 38 of the first segment abuts the edge 36 of the adjacent segment to complete the unloaded ball path portions 20. Moreover, I form each of the lugs with a generally triangular cross sectional shape as shown in FIG. 10 so that the lugs complete the transfer path portions 22 in the finished assembly. Each of the lugs 56 and 58 has an axial width which is slightly less than the width of groove 40.

In use of my segmental retainer 16 I first assemble a number of my segments 30 to form a complete annulus with the lugs 56 and 58 of one retainer extending into the adjacent segment 30 at locations at which they overlie the curved path portions 42 and 44. As this is done the side edges 36 and 38 are brought into abutting relationship. In the particular configuration shown I provide a cage or retainer 16 which is made up of eight segments. It will readily be appreciated that a greater or lesser number of segments may be required where more or less ball paths are to be provided.

After the segments have been assembled in a suitable fixture they are retained therein and the balls 26 and rollers 24 are assembled in the retainer. As this assembly is removed from the fixture a sleeve such as sleeve 12 is applied thereto and the bearing is ready for installation.

It will readily be apparent from the configuration of my retainer segments 30 illustrated in the drawings that a die for framing the segment is appreciably less complex than a die which would be required to form a unitary retainer. Having made the die, a plurality of retainer segments can be cast from any suitable material such as zinc or aluminum or the like.

It will be seen that I have accomplished the objects of my invention. I have provided a segmental retainer for a combined axial and rotary bearing. My segmental retainer can be die cast at an overall cost which is appreciably less than the cost of casting a unitary retainer of similar configuration. My segmental retainer does not require any separate transfer path cam member. While I have shown rollers with tapered ends, it is to be understood that, if desired, I could use ends with different configurations, such as squared ends. The retainers are described as being made of suitable metal, such as zinc. The zinc castings can be chrome or nickel-plated, if desired. The retainers furthermore can be made sufficiently thick to accommodate two rollers such as is shown in my copending application, above identified.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

I claim:

1. A segmental cage for a bearing including in combination, a plurality of integral axially elongated arcuate segments adapted to be juxtaposed to form an axially elongated annulus, each of said segments being formed with a generally axially extending slot with curved slot portions at the ends of said slot, each of said segments being formed with a generally axially extending recess circumferentially spaced from the segment slot with curved inwardly extending recess portions at the ends of said recess leading into said curved slot portions and means for positioning adjacent segments to cause said slots to form loaded ball path portions and said recesses to form unloaded ball path portions and to cause said curved slot and recess portions to form ball transfer path portions.

2. A segmental cage as in claim 1 in which each of said segments had radially directed axially extending edges, said recess being formed adjacent to and leading into one of said edges, the other edge of an adjacent segment cooperating with said one edge to form said unloaded ball path portion.

3. A segmental cage as in claim 1 in which each of said segments has a cylindrical inner surface and means forming a retaining lip along the edge of said slot adjacent said inner surface.

4. A segmental cage as in claim 1 in which said juxtapositioning means comprises axially spaced circumferentially extending lugs on the edge of one segment extending into the adjacent segment over said curved recess portions.

5. A segmental cage as in claim 4 in which each of said lugs is formed with a generally triangular cross section providing a surface forming part of said transfer path portions.

6. A segmental cage as in claim 1 in which each of said segments is a unitary metal member.

7. A segmental cage for a bearing including in combination, a plurality of axially elongated segments each having a cylindrical inner surface and a cylindrical outer surface and side edges lying in radial planes, each of said segments being formed with a generally axially extending slot intermediate the side edges with curved end slot portions directed toward one of said side edges, each of said segments being formed with a generally axially extending recess in said outer surface adjacent to and leading into said one side edge, curved and inwardly directed recess portions directed toward the other side edge and extending into said curved slot portions, and axially spaced lugs extending circumferentially from the other side edge, the lugs of one segment adapted to extend into the curved recess portions of an adjacent segment to position said segments so that said slots form loaded ball path portions and said recesses form unloaded ball path portions and said lugs and curved slots and recess portions form ball transfer path portions.

8. A segmental cage as in claim 7 in which said one edge of one segment abuts the other edge of an adjacent segment to form said unloaded ball path portion.

9. A segmental cage as in claim 7 in which each of said lugs has a generally triangular cross sectional shape to provide a portion of the surface of said ball transfer path portions.

10. A segmental cage as in claim 7 in which each segment comprises a retaining lip along the edge of said slot adjacent to said inner surface.

11. In a segmental cage, a unitary cage segment comprising an axially elongated unitary body having cylindrical inner and outer surfaces and having side edges lying in radial planes, means forming a generally axially extending slot in said body with curved end slot portions directed toward one of said edges, means forming a generally axially extending groove in said outer surface adjacent to and leading into one of said sides with curved and radially inwardly extending end groove portions leading into said curved slot portions and circumferentially extending spaced lugs each having generally triangular cross sectional shape on the other side, said lugs registering generally with the junctures of said curved groove and slot portions, said lugs having an axial width slightly less than that of said groove.

* * * * *